United States Patent [19]
Rypinski

[11] 3,847,085
[45] Nov. 12, 1974

[54] DUAL-MODE TRANSPORTATION SYSTEM

[75] Inventor: Albert B. Rypinski, Teaneck, N.J.

[73] Assignee: Duo-Mode Electric Transport System, Inc., Teaneck, N.J.

[22] Filed: July 23, 1973

[21] Appl. No.: 381,440

Related U.S. Application Data

[63] Continuation-in-part of Ser. No. 379,203, July 16, 1973, which is a continuation of Ser. No. 89,266, Nov. 13, 1970, abandoned.

[52] U.S. Cl.................. 104/122, 104/89, 105/50
[51] Int. Cl............................................. B61b 3/00
[58] Field of Search....... 104/18, 118, 122, 89, 106, 104/20; 105/50, 148; 191/2

[56] References Cited
UNITED STATES PATENTS

| | | | |
|---|---|---|---|
| 1,636,619 | 7/1927 | Archer | 104/122 |
| 3,169,733 | 2/1965 | Barrett | 105/50 |
| 3,457,876 | 7/1969 | Holden | 104/122 |

Primary Examiner—M. Henson Wood, Jr.
Assistant Examiner—D. W. Keen
Attorney, Agent, or Firm—Karl F. Ross; Herbert Dubno

[57] ABSTRACT

An overland vehicle, such as a minibus, is transported along part of its way on an overhead track with the aid of a motor module riding along that track. The motor module supports a platform, suspended from it by hoisting cables, which in turn has jaws engageable with the top of the vehicle for lifting it off the surface and subsequently lowering it onto a load. The vehicle is powered by a storage battery which is recharged during overhead travel from a bus bar extending along the track. Means are provided for preventing the disengagement of the jaws from the vehicle as long as the same is suspended.

12 Claims, 16 Drawing Figures

DUAL-MODE TRANSPORTATION SYSTEM

1. CROSS-REFERENCE TO RELATED APPLICATION

The present application is a continuation-in-part of my copending application Ser. No. 379,203, filed on July 16, 1973 as a continuation of my application Ser. No. 89,266 which was filed on Nov. 13, 1970 and is now abandoned.

2. FIELD OF THE INVENTION

My present invention relates to a dual-mode transportation system in which passengers or goods are carried partly on and partly above the surface.

3. BACKGROUND OF THE INVENTION

The increasing density of traffic, particularly in or near urban centers, makes it imperative to avoid the use of surface routes in carrying loads across zones of actual or potential congestion between points which cannot be conveniently served by aircraft or underground transit systems.

4. OBJECTS OF THE INVENTION

The general object of my present invention is to provide an improved transportation system designed to satisfy this need.

A more specific object is to provide means to facilitate the use of electric power for both surface and overhead travel in a dual-mode transportation system, thereby eliminating the pollution due to the exhaust fumes of internal-combustion engines.

A further object of this invention is to provide safeguards for insuring dependable operation of the system.

5. SUMMARY OF THE INVENTION

In my copending and abandoned applications identified above, I have disclosed a transportation system wherein self-propelled vehicles such as passenger automobiles, railroad cars, trucks or buses are transported along part of their way on an overhead track with the aid of respective motorized carriers circulating along that track. The vehicles arrive along their normal surface routes at a first location, forming a junction with the track, and are there lifted off the ground for conveyance to a second location where they are again lowered onto the surface in order to continue their travel in the normal manner. The carriers include wheeled motor modules, riding on the overhead track, and lifting platforms suspended from these modules by hoisting cables which enable a platform to be lowered onto the roof of a vehicle to be engaged thereby and to be raised thereafter to a level well above surface traffic for entrainment by the module. The track has the form of an inverted-U structure whose legs terminate in a pair of horizontal shelves acting as rails for the wheels of the motor modules; this structure is, in turn, held aloft by cables anchored to pairs of columns which flank a highway or the right-of-way of a railroad at the point of interchange.

In accordance with a more particular feature of my present invention, the surface vehicles to be intermittently transported on an overhead carrier are electrically driven with the aid of a power supply including a storage battery of sufficient capacity to let them cover the distance from their starting point to the first transfer point (where they are hoisted up to the overhead carrier) and, upon recharging, the distance from the second transfer point (where they are returned to the surface) to their ultimate destination. Between these two transfer points, i.e. during the ride along the overhead track, a connection is established between a live conductor along the track and the battery aboard the vehicle for recharging the latter. In an emergency, as in the case of power failure preventing the operation of the hoist motor for lowering the vehicle to the ground, the battery may be switched into the circuit of that motor to energize same.

According to another feature of my invention, the lifting platform is provided with coupling means designed to release an engaged vehicle only when the same has come to rest on the surface, thereby preventing any untimely decoupling in the suspended state of the vehicle. This safeguard against premature release may be realized by means of mechanically interlocking formations and/or via stop means preventing the displacement of a set of gripper members into a decoupling position. Furthermore the lifting platform may be locked to the motor module independently of its hoisting cables upon reaching its highest level.

A further feature of my present invention, designed to minimize the shock of lifting and the impact of redeposition on the ground, resides in the provision of specially designed sheaves for the hoisting cables which, upon being driven at constant speed by an associated motor, let the cables be wound up thereon with an ever-increasing radius and consequent progressive acceleration during the lifting operation. Conversely, the speed decreases progressively upon the lowering of the vehicles to the ground.

The hoist motor, as well as other motors used in the operation of the system, may additionally be provided with conventional braking means (e.g. disk brakes) by which they are positively arrested upon deenergization. The interposition of self-locking transmission means such as worm drives between the hoist motor and the cable sheaves further enhance the stability of the lifting mechanism.

Although the system of my invention is mainly intended for use with land vehicles, such as minibuses, it could also be utilized for the ferrying of water vehicles such as motorboats from one body of water to another.

BRIEF DESCRIPTION OF THE DRAWING

The above and other features of my invention will now be described in detail hereinafter with reference to the accompanying drawing in which.

7. SPECIFIC DESCRIPTION

Figure 1:
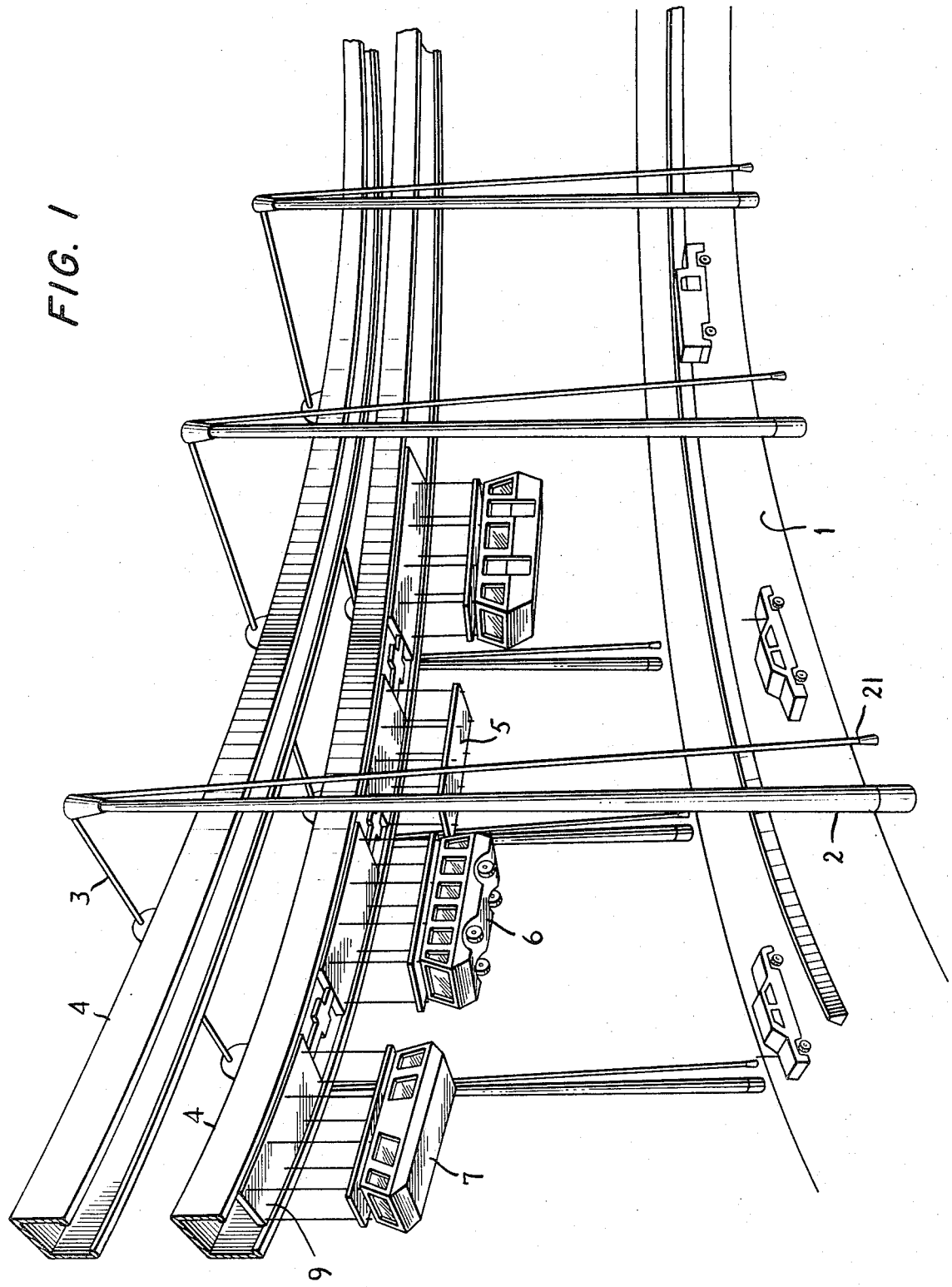
FIG. 1 is a perspective view of part of an interchange between a highway and an overhead track in a system according to my invention.

In FIG. 1 I have shown a six-lane highway 1 flanked by pairs of columns 2 from which cables 3 extend to support a pair of parallel trackways 4. Backguys 21 brace the columns against tilting. A self-propelled vehicle 6 and several passenger cabins 7 are suspended from respective platforms 5 which in turn are supported by motor modules 9 as more fully described hereinafter.

Figure 2:
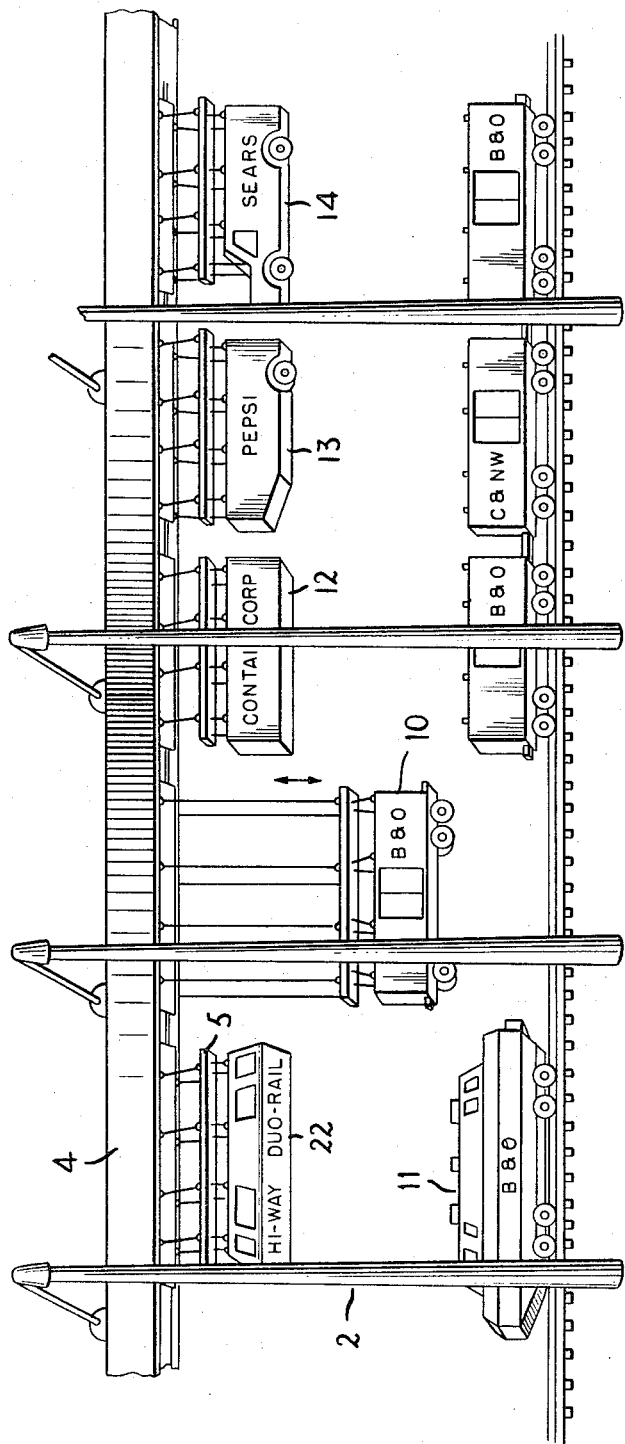
FIG. 2 is a similar view of an interchange between an overhead track and a rail line.

In FIG. 2 I have shown a similar trackway 4 whose columns 2 straddle a railway line running alongside a highway not visible in the Figure. Railroad cars 10, along with an associated engine 11, may also be hoisted up by vacant lifting platforms 5 or redeposited on the railroad track, some of these platforms being also shown coupled to a container 12, a semitrailer 13, a track 14 and a wheelless control car 22. The vehicles to be so transported, over part of their route, include electrically powered minibuses as shown at 50 in FIGS. 3 and 4.

Figure 4:
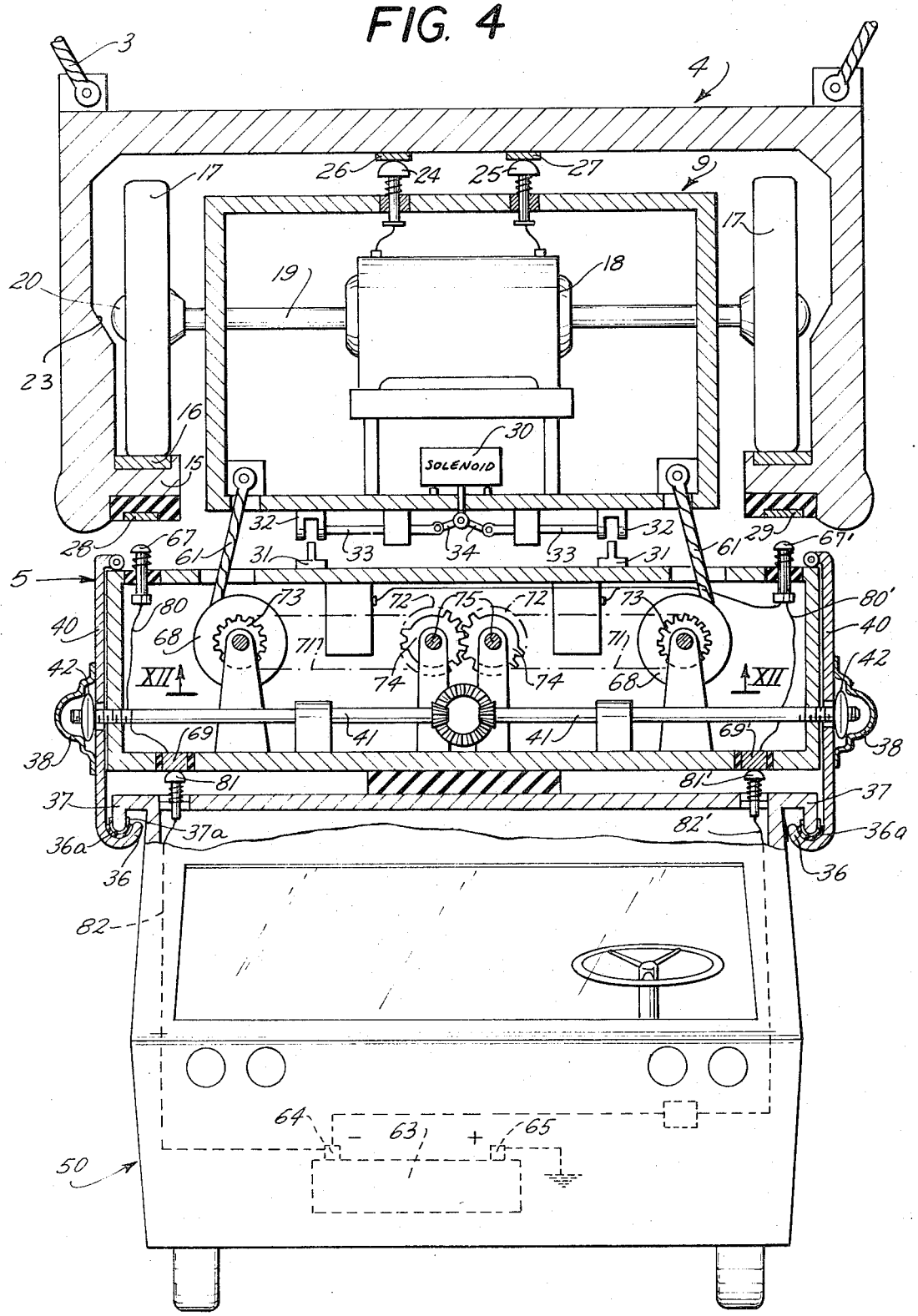
FIG. 4 is a front view, partly in section, of the minibus of FIG. 3 suspended from a motor module on a track such as that shown in FIGS. 1 and 2.

The trackway 4 may consist of a multiplicity of longitudinally adjoining segments of inverted-U-shaped profile, as illustrated more clearly in FIG. 4, with interposition of nonillustrated expansion joints of like profile. The length of the inverted U form ledges 15 with inserted traction layers 16 acting as supporting rails for wheels 17 of a motor module 9. The latter includes an electric drive motor 18 with shafts 19 for the wheels 17, there being two or more pairs of wheels (not all of them necessarily driven) for each module. The shafts 19 terminate in hubs 20 which, as more fully described in my abandoned and copending applications, ride up a ramp 23 on the inner surface of track structure 4 under the action of the centrifugal force when the track curves in the opposite direction, thereby lifting the outer wheel off its rail 16 to minimize frictional wear due to difference in peripheral speeds. This feature eliminates the need for a differential coupling between the drive motor 18 and the paired wheels 17.

Motor 18 is energized by way of contactors 24, 25 which constantly bear upon respective bus bars 26, 27 extending longitudinally along the trackway. Further bus bars, two of which have been illustrated at 28, 29, serve to supply power to other parts of the electric system supported by motor module 9. These parts include a normally energized solenoid 30 which is de-energized, under the control of a nonillustrated sensor, as soon as the associated platform 5 has been elevated to a position (higher than that shown in FIG. 4) just below that module in which a pair of upstanding brackets 31 on platform 5 enter into bifurcate brackets 32 on module 9 whereby two rods 33 can pass through respective perforations of these brackets to lock the plate to the module. The outward shift of the rods 33 upon de-energization of solenoid 30 is brought about by a toggle linkage 34 which also withdraws the rods from the brackets 31 upon manual re-energization of the solenoid.

Figure 12:
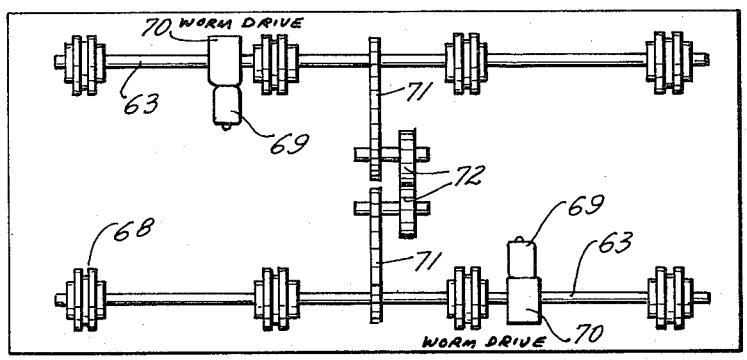
FIG. 12 is a somewhat diagrammatic bottom view taken on the line XII—XII of FIG. 4.

The relative motion of platform 5 and module 9, in the retracted state of the toggle mechanism 33, 34, is brought about by several pairs of sheaves 68 (see also FIGS. 12 – 14) having hoisting cables 61 wound thereon. Sheaves 68, journaled within the interior of platform 5, have shafts 63 driven by two synchronized motors 69 (FIG. 12) via worm-type reduction gears 70. Shafts 63 also carry sprocket wheels 73 linked via chains 71 with other sprocket wheels 74 on a pair of stub shafts 75 to which two intermeshing gears 72 are keyed. The sheaves on opposite sides of the platform therefore rotate in opposite directions to increase or decrease the effective length of cables 61, thereby lowering or raising the platform 5 with reference to module 9.

Figure 13:
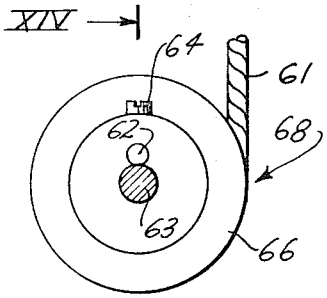
FIG. 13 is a side view of a cable sheave forming part of the hoisting mechanism shown in FIGS. 4 and 12.
Figure 14:
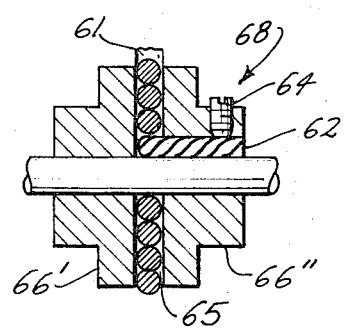
FIG. 14 is a cross-sectional view taken on the line XIV—XIV of FIG. 13.

As illustrated in FIGS. 13 and 14, each sheave 68 comprises a flanged pulley whose two halves 66', 66'' define between them a peripheral channel 65 of a width only slightly larger than the thickness of cable 61, the depth of this channel equaling several times that thickness whereby the cable can be wound up therein in a number of spiral turns. The inner end of the cable is received in an axial bore 62 of pulley half 66'' in which it is held in position by a setscrew 64. Thus, rotation of the sheave in a lifting direction (clockwise in FIG. 13) causes a progressive increase in turn radius whereby a constant speed of drive shaft 63 is translated into a progressive acceleration of the ascending movement of the platform. Conversely, the platform speed decreases upon a lowering thereof with sheave 68 rotating in the opposite (counterclockwise) direction.

Figure 11:
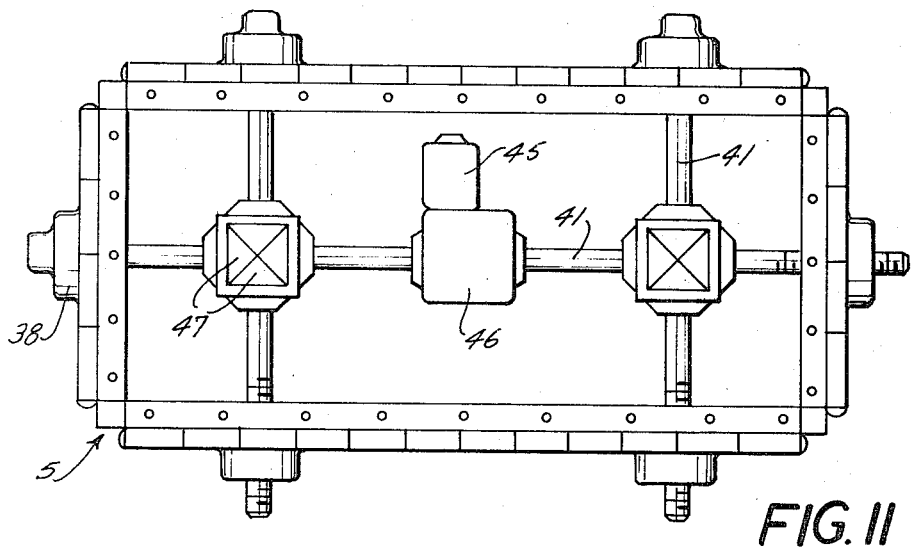
FIG. 11 is a top view of a lifting platform illustrated in FIG. 4, showing the overall drive of the associated coupling mechanism with the platform cover removed.

As further shown in FIG. 4 and more fully illustrated in FIG. 11, each side of the rectangular platform has hinged to it a respective flap 40 to form two pairs of jaws swingable in mutually orthogonal planes. Each flap 40 is generally J-shaped and has its lower extremity formed as a trough with an internal lip 36 designed to receive a peripheral flange 37 on the roof of bus 50. The trough and the flange, which are formed with plastic cushioning layers 36a and 37a, positively interlock in the suspended state of the vehicle, as seen in FIG. 4. The bus 50 carries on its top a pair of resilient pads 48 which are interposed between its roof and the bottom of platform 5 to cushion the impact of the platform as it is lowered upon the vehicle standing on the ground or moving along the highway at substantially the speed of the overlying module 9. The pads 46 also serve to steady the suspended vehicle against the platform; after the bus 50 has been redeposited on the ground, they are somewhat compressed in the final stage of platform descent so that the flange 37 clears the lip 36 to enable an outward swinging of the flap 40 as illustrated in FIG.

5. Thus, platform 9 can be coupled to or decoupled from the vehicle only when the latter is firmly positioned on the surface.

The swinging of flaps 40 is controlled by a set of leadscrews 41 which pass through nuts 42 that are received with some clearance in housings 38 secured to the outer surface of flaps 36. The leadscrews 41 are driven by a reversible motor 45 through a reducing gear 46 and two sets of bevel gears 47.

Figure 5:
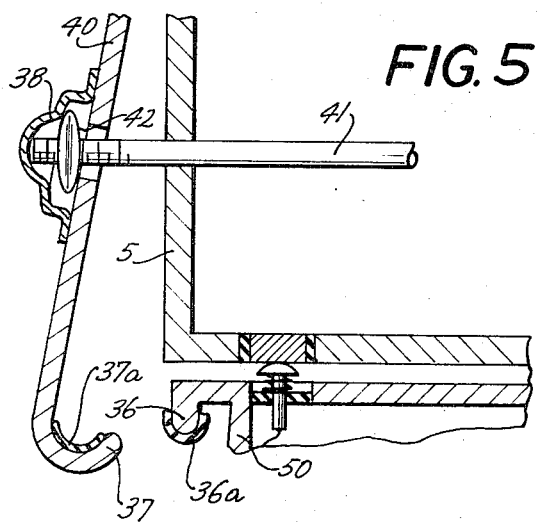
FIG. 5 is a fragmentary detail view illustrating the operation of a coupling mechanism in releasing the vehicle from its carrier.
Figure 6:
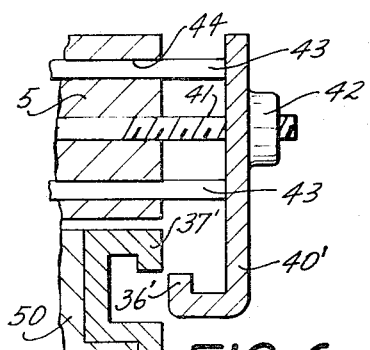
FIGS. 6, 7 and 8 are views similar to FIG. 5, showing a modified coupling mechanism in three operating positions.
Figure 7:
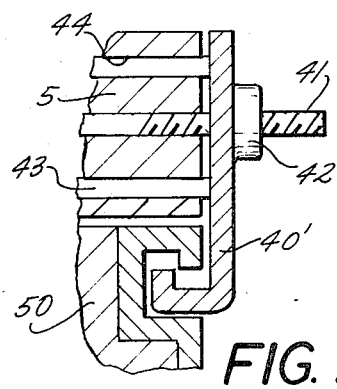
Figure 8:
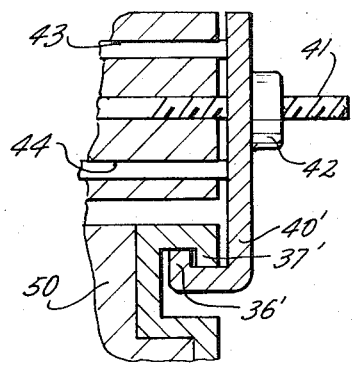

FIGS. 6 – 8 illustrate an alternate arrangement in which jaws 40' are mounted on supporting rods 43 for translational movement relative to platform 5 and vehicle 50. In this instance, the nuts 42 are fixedly secured to the flaps which are again substantially J-shaped, having lips 36' which interlock with flanges 37' in the suspended position of the vehicle. The rods 43 are guided in bores 44 of the platform wall which for this purpose is somewhat heavier than in the embodiment of FIGS. 4 and 5.

Figure 9:
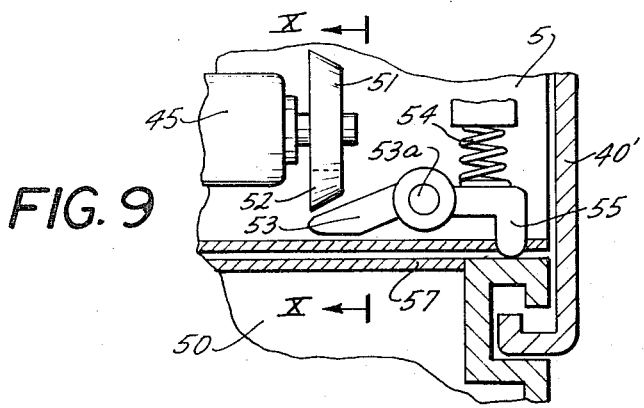
FIG. 9 is another view similar to FIG. 5, showing a stopping device for the drive of the coupling mechanism.
Figure 10:
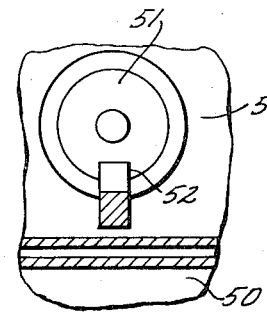
FIG. 10 is a cross-sectional view taken on the line X—X of FIG. 9.

In FIGS. 9 and 10 I have shown a safety mechanism for stopping the drive of leadscrews 41 in any relative position of platform 5 and vehicle 50 other than that shown in FIG. 5. The shaft of motor 45 carries a disk 51 with a peripheral slot 52 engageable by a detent 53 which is pivoted at 53a and is urged by a spring 54 against the periphery of the disk. Detent 53 is one arm of a lever whose other arm 55 passes through an opening in the bottom of the platform 5 to engage the top of vehicle 50 when the latter is close to the underside of the platform. If this is not the case, spring 54 urges the detent into the slot 52 to arrest the motor 45. Though this mechanism has been specifically illustrated in combination with a jaw coupling of the type shown in FIGS. 6–8, it can evidently also be used with swingable flaps according to FIGS. 4, 5 and 11.

Figure 15:
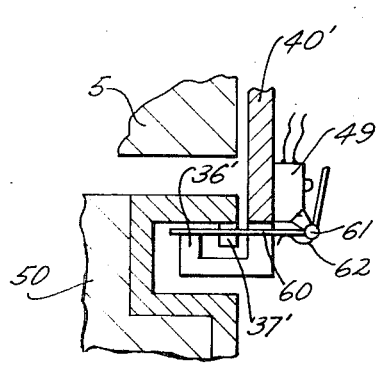
FIG. 15 is another fragmentary view similar to FIG. 5, illustrating a safety switch for the coupling mechanism.
Figure 16:
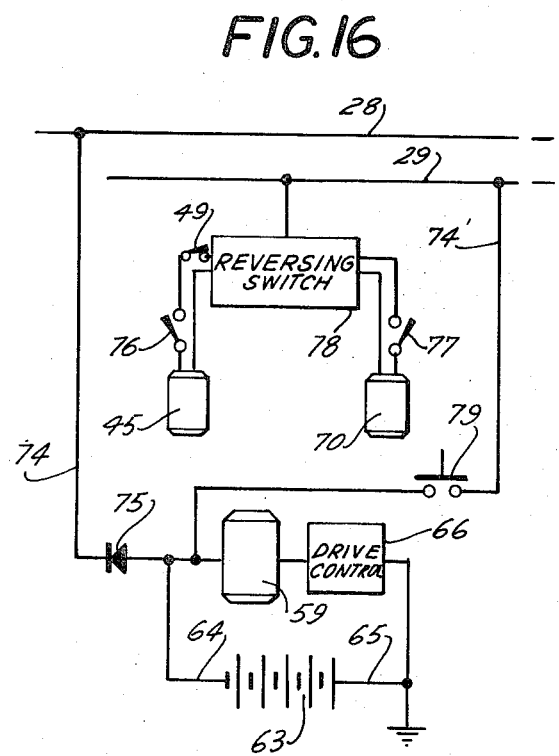
FIG. 16 is a circuit diagram for the system shown in FIGS. 3 – 15.

Another safety measure, utilizable jointly with that of FIGS. 9 and 10 or as an alternative thereto, has been illustrated in FIG. 15 and comprises a switch 49 in the circuit of motor 45 (see also FIG. 16). This switch is carried on one of the slidable jaws 40' (obviously, a swingable flap 40 could be similarly equipped) and is controlled by a lever 60 pivoted to that jaw at 61, a spring 62 urging the lever in a sense (here clockwise) causing its disengagement from pushbutton switch 49. Lever 60, passing through aligned slots in lip 36' and flange 37', bears on the underside of the overhanging roof portion of vehicle 50 and swings counterclockwise to trip the switch 49, thereby opening the circuit of motor 45, whenever the vehicle is in its suspended position in which the elements 36' and 37' interlock, as in FIG. 8.

Figure 3:
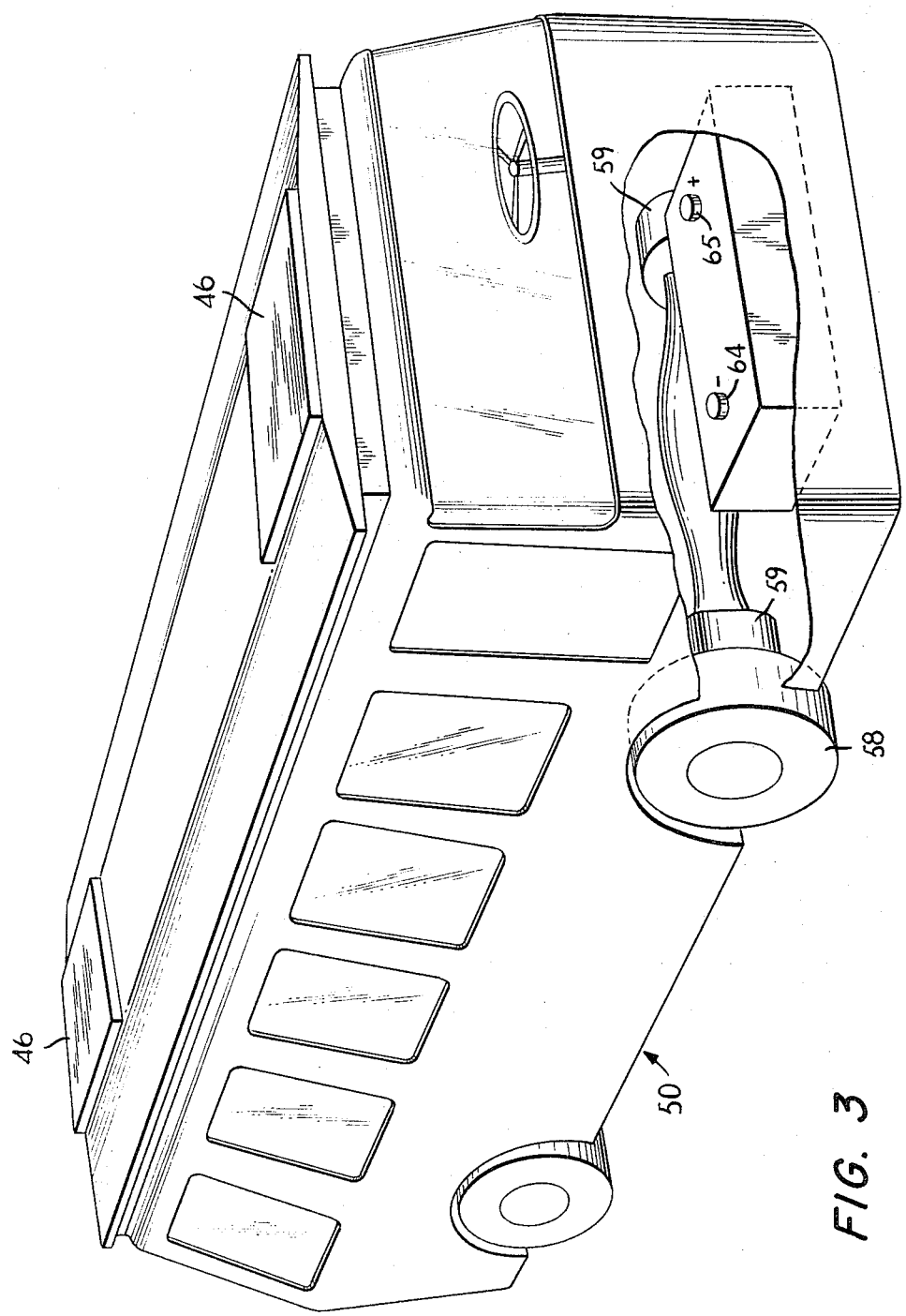
FIG. 3 is a perspective view of a minibus adapted to be transported by my improved system.

The bus 50 has traction wheels (here its front wheels 58) driven by a pair of electric motors 59 which, during surface travel, are energized from a storage battery 63 with a negative terminal 64 and a positive terminal 65, see FIGS. 3 and 4, this battery also supplying the other needs of the vehicle such as illumination, ignition and heating or cooling. Terminal 65 is preferably grounded, as indicated in FIGS. 4 and 16. Motors 59 (only one of which is shown in FIG. 16) are provided with driver-operated control means 66 and, of course, are disconnected while the bus 50 is being transported by the overhead carrier 5, 9. During such transportation the live terminal 64 is conductively connected to the bus bar 28, assumed to carry negative voltage, through a spring-loaded contactor 67 in the cover of platform 5, a lead 80, a metallic insert 69 insulatedly disposed in the bottom of the platform, another spring-loaded contactor 81 rising from a recessed seat in the roof of bus 50, and a further lead 82 including a diode 75. Thus, battery 63 is recharged while the vehicle and its passengers travel from the first to the second transfer point.

Similar contactors 67', 81', leads 80', 82' and a metallic insert 69' establish at the same time an energizing circuit from bus bar 29 for motors 45 and 70 by way of respective circuit breakers 76, 77 and a common reversing switch 78 which may be controlled manually or automatically to operate these motors at the proper instants. The safety switch 49 lies in series with circuit breaker 76.

A manually operable emergency switch 79 closes an ancillary energizing circuit for motors 45 and 70, via bus bar 29, from storage battery 63 in order to enable the lowering of the platform 5 and the release of the vehicle on the surface in the event of a power failure in the external supply system. This ancillary circuit could also be extended, if desired, to the drive motor 18 to permit the continuation of carrier motion to a location suitable for the deposition of the vehicle.

I claim:

1. A transportation system comprising:
   a self-propelled surface vehicle;
   an overhead track extending over part of a route to be traveled by said vehicle;
   a motor-driven vehicle carrier riding on said track; and
   hoist means on said carrier engageable with said vehicle for lifting same off the surface at a first location and redepositing same on the surface at a second location interlinked with said first location by said track, said hoist means comprising a platform, cable means suspending said platform from said carrier, reversible wind-up means for said cable means on said platform, and coupling means on said platform engageable with the top of said vehicle for suspending same from said platform upon a raising of the latter by operation of said wind-up means.

2. A system as defined in claim 1 wherein said vehicle is provided with electric drive means and a power supply including a storage battery for said drive means, further comprising live conductor means extending along said track and connector means on said carrier for completing a charging circuit for said storage battery from said conductor means during transportation of said vehicle along said track.

3. A system as defined in claim 2 wherein said hoist means is provided with an electric motor normally energizable from said conductor means, further comprising switch means operable to close an emergency circuit from said battery to said motor upon power failure on said conductor means.

4. A system as defined in claim 1 wherein said coupling means comprises at least one pair of gripper members engageable with complementary formations on opposite sides of said vehicle.

5. A system as defined in claim 4 wherein said gripper members and said formations are provided with interlocking lips effective in the suspended state of said vehicle to prevent disengagement of said gripper members from said formations.

6. A system as defined in claim 5, further comprising resilient cushioning means interposed between said vehicle and said platform upon a lifting of the vehicle by said hoist means, said cushioning means being sufficiently compressible to facilitate interengagement and disengagement of said gripper members and formations with said vehicle resting on the surface.

7. A system as defined in claim 4, further comprising actuating means for displacing said gripper members between a coupling position and a decoupling position, and stops means for said actuating means effective in the suspended state of said vehicle to prevent a displacement of said gripper members into said decoupling position.

8. A system as defined in claim 1 wherein said cable means comprises a plurality of cables anchored to different parts of said platform, said wind-up means comprising individual sheaves for said cables and a common drive for said sheaves.

9. A system as defined in claim 8 wherein said common drive is a constant-speed motor, each of said sheaves being a flanged pulley having a peripheral channel of a width substantially equaling the thickness of the associated cable and of a depth substantially exceeding said thickness for enabling the cable to be wound up in a multiplicity of turns with progressive increase in lifting speed upon a raising of the vehicle off the surface.

10. A system as defined in claim 1, further comprising locking means for securing said platform to said carrier independently of said cable means upon elevation of said platform to its highest level relative to said track.

11. A system as defined in claim 10 wherein said locking means comprises a toggle mechanism.

12. A transportation system comprising:
a self-propelled surface vehicle;
an overhead track extending over part of a route to be traveled by said vehicle;
a motor-driven vehicle carrier riding on said track; and
hoist means on said carrier engageable with said vehicle for lifting same off the surface at a first location and repositing same on the surface at a second location interlinked with said first location by said track, said vehicle being provided with electric drive means and a power supply including a storage battery for said drive means, further comprising live conductor means extending along said track and connector means on said carrier for completing a charging circuit for said storage battery from said conductor means during transportation of said vehicle along said track, said hoist means being provided with an electric motor normally energizable from said conductor means, further comprising switch means operable to close an emergency circuit from said battery to said motor upon power failure on said conductor means.

* * * * *